April 12, 1938.  E. M. WRIGHT  2,114,065
DIE FOR TWISTING CABLE CONNECTERS
Filed May 23, 1936
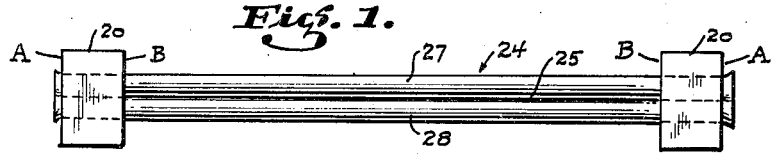
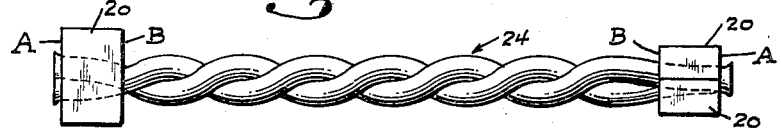
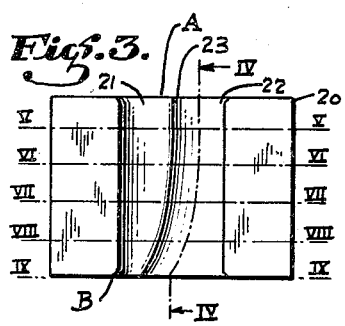
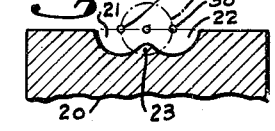
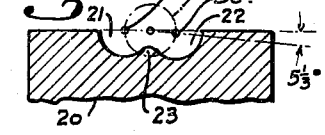
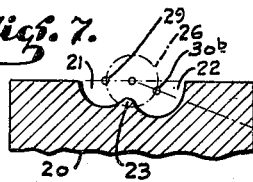
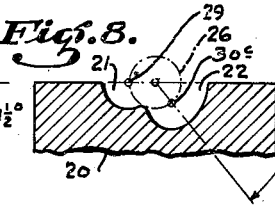
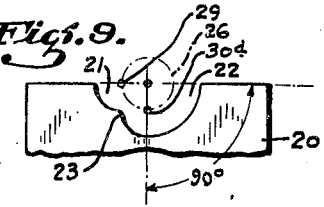
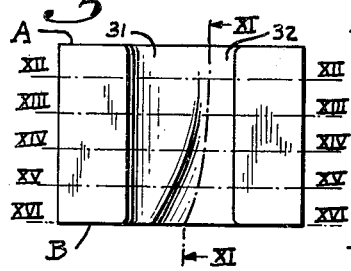
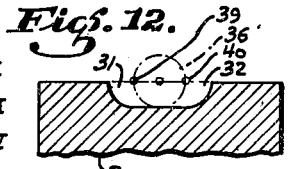
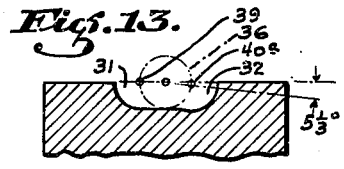
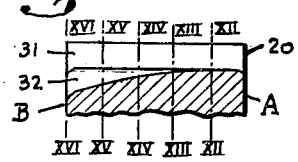
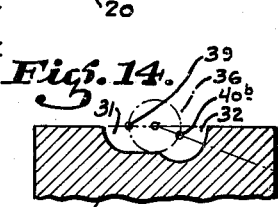
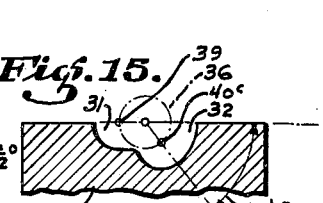
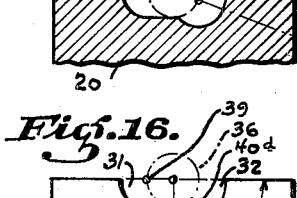
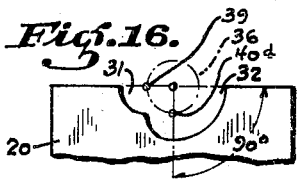
INVENTOR.
Ernest M. Wright.
BY
Chas. E. Townsend.
ATTORNEY.

Patented Apr. 12, 1938

2,114,065

UNITED STATES PATENT OFFICE 2,114,065

DIE FOR TWISTING CABLE CONNECTERS

Ernest M. Wright, Oakland, Calif.

Application May 23, 1936, Serial No. 81,440

4 Claims. (Cl. 140—119)

This invention relates to devices which may be used for twisting cables about each other or for twisting sleeves within which such cables are positioned, to make a firm, tight and strong mechanical joint and/or to make an electrical connection which not only has but maintains indefinitely the desired high electrical conductivity.

It has already been proposed to twist cables or wires consisting either of a single strand or of any number of strands about each other to join them to make a connection which is satisfactory from the mechanical point of view, or from the electrical point of view, or both, and various devices have been proposed to make the twist. It has also been proposed to twist the ends of such cables directly about each other or to insert them into a tube or sleeve, generally throughout the whole length of the sleeve, and then twist the sleeve and therewith the cables therein. It has further been proposed to use for this purpose tubes or sleeves having various forms; for example, one in which the cross section is semi-circular at each end, the semi-circles being joined by straight lines; one in which the web connecting the rounded ends is indented so that the ribs formed by the indentations meet, the tube thus having a figure-8 cross section; one in which such indentations are not sufficiently deep to meet; and perhaps others as well. Regardless of the cross section of the tube used and of the type of cable, the formation of the twisted joint has heretofore always resulted in a mechanical weakening of the cable, and this is true regardless of whether the electrical connection made be satisfactory or not.

The main objects of my invention are to produce a joint of the type referred to, minimizing the weakening of the cable, and to produce a means to accomplish this purpose, and any other object of my invention will become apparent on reading the appended specification.

My dies are used in pairs, one of the pair being placed on one side of the article to be twisted and the other die of the pair on the other, opposite each other so that the article to be twisted can be clamped thereby, suitable means being used to clamp these pairs onto the article, and to twist them. Generally, one man twists one die and another the other, the twisting being in opposite directions, but it is, of course, understood that one die may be held stationary and all the twisting done at one end. Dies have been previously used for this purpose and such dies have been grooved.

In my dies the groove at one active end thereof fits the article to be twisted rather closely, while at the other end of the dies the groove is enlarged in a peculiar manner which may be described as twisting it to permit the article receiving a controlled twist within the die itself as the dies are given their twist after being clamped on the article. That part of the article lying without the dies and between them is given an even twist by the twisting operation, and one of the principal features of my invention is to form the grooves within the die in such a manner that within the die the pitch of the twist is gradually retarded without any sharp bends or twists, from the fully twisted portion of the article throughout to the fully untwisted portions thereof. The avoidance of sharp twists or bends obviates the substantial weakening of any part of the joint.

In order to effect the gradation from full twist to full lack of twist without any sharp bend at any point therein I simply accelerate, gradually and smoothly, the twist of the grooves within the dies from a point at the fully untwisted portion of the article up to the fully twisted portion thereof.

Having explained the principle of my invention, I will now explain specific embodiments thereof, it being understood that these are merely to illustrate it without in any way limiting the scope thereof.

Referring to the drawing which forms a part of this specification—

Fig. 1 is a plan view of a ribbed sleeve before twisting, with my twisting dies applied at the ends thereof;

Fig. 2 is a similar view after twisting;

Fig. 3 is a plan view of one of a pair of dies;

Fig. 4 is a longitudinal section thereof on the lines IV—IV of Fig. 3 looking in the direction of the arrows;

Fig. 5 is a cross section of the die on the lines V—V of Figs. 3 and 4;

Fig. 6 is a similar section on the lines VI—VI thereof;

Fig. 7 is a similar section on the lines VII—VII thereof;

Fig. 8 is a similar section on the lines VIII—VIII thereof;

Fig. 9 is an end elevation on the lines IX—IX thereof;

Fig. 10 is a plan view of a modification;

Fig. 11 is a longitudinal section on the lines XI—XI of Fig. 10, looking in the direction of the arrows;

Fig. 12 is a cross section on the lines XII—XII of Figs. 10 and 11;

Fig. 13 is a similar section on the lines XIII—XIII thereof;

Figure 14 is a similar section on the lines XIV—XIV thereof;

Fig. 15 is a similar section on the lines XV—XV thereof; and

Fig. 16 is an end elevation on the lines XVI—XVI thereof.

My dies, as stated, are used in pairs, the two members of a pair being similar and, in fact, they may be alike in all details. One such die is illustrated at 20. Each die of a pair has a groove 21 and a groove 22; each of these grooves running straight longitudinally of the die and there being a rib 23 between them in this modification, this rib being slightly rounded off, as are all edges in accordance with good practice. The grooves may be made without a twist up to the lines V—V (Figs. 3 and 4) from the end nearest thereto, so that a section taken anywhere between such end and the lines V—V will be the same as shown in Fig. 5. The dimensions and form of the grooves 21 and 22 are such that the dies fit neatly over the article 24 which is to be given a twist without any sharp bends appearing therein, in this case the article having a top and a bottom indentation along the lines 25, the rib 23 fitting therewithin.

I enlarge the groove 22 progressively in each die of the pair, since when these two members of the pair are laid face to face with the article to be twisted between them, the groove 21 of each of the pair will lie opposite the groove 22 of the other of the pair, thus permitting the article to be twisted, with a retarded twist given to the article gradually and without a sharp bend from the point of full twist to the point of no twist at all.

In order to enlarge each groove 22, I theoretically draw a circle 26 having a diameter equal to the theoretical diameter of each half 27, 28 of the article. The center of curvature 29 of the groove 21 and the center of curvature 30 of the groove 22 lie on this circle and in a horizontal line, and on progressing along the die, downwardly as seen on Fig. 3, the center of curvature, say, of the new part added to the groove 22 begins travelling around this circle. For example, as shown on Fig. 6, the center 30 has moved along an arc on the theoretical circle 26 of about 5⅓° to the position at 30a, while the center of curvature 29 of the groove 21 remains stationary. As shown on Fig. 7, this center of curvature has moved to the point 30b by passing along the theoretical circle through an arc of about 21½°, while the center of curvature of the groove 21 remains stationary. As shown on Fig. 8, the center of curvature of the groove 22 has moved to the point 30c by passing through an arc of about 49⅓° on the theoretical circle, while the center of curvature of the groove 21 remains stationary. On Fig. 9, that is at the end of the die, the center of curvature of the groove 22 has moved through an arc of 90° along the theoretical circle 26 to the point 30d, while the center of curvature of the groove 21 remains stationary. As will be seen from the previous description, the center of curvature of the groove 21 does not change its position at all.

In use, the groove 21 of one of the dies lies opposite the groove 22 of the other die so that each groove permits twisting of an article which has the form and dimensions for which the pair of dies is designed.

Theoretically the grooves 21 and 22 are cut longitudinally of the die throughout its whole length and new parts are added continuously and progressively along the die to the groove 22.

The modification of Figs. 10-16 is similar to the first modification, but the central rib 23 is omitted, leaving a groove comprising two parts, 31 and 32. These parts are similar at the lines XII—XII of Figs. 10 and 11, where the center of curvature of the groove 31 is at the point 39 and the center of curvature of the groove 32 is at the point 40, both these points lying on the horizontal diameter of a theoretical circle 36, the radius of this circle 36 being equal in length to the radii of curvature of the grooves 31 and 32. Theoretically, each groove 31 and 32 is cut along the whole length of the die. On proceeding along the die, i. e., from left to right as shown on Fig. 11, the groove 32 is enlarged, this being accomplished by adding new parts to the groove 32 continuously and progressively, at least in theory, by moving the centers of curvatures of the new parts of this groove around the circle 36 through an arc of about 5⅓° thereof up to the line XIII—XIII (similarly to the device of the first modification as illustrated on Fig. 6), the center 39 of curvature of the groove 31 remaining stationary throughout the length of the die. As shown on Fig. 14, the center of curvature of the new part of the groove 32 has moved around the circle 36 through an arc of about 21½° thereof. As shown on Fig. 15, the center of curvature of the new part of the groove 32 has moved around the circle 36 through an arc of about 49⅓°. As shown on Fig. 16, the center of curvature of the new part of the groove 32 has moved through an arc of 90° along the theoretical circle 36.

The two modifications above described are similar except that the second does not have the central rib 23 present in the modification. The ends of the twisted article are generally left untwisted, and with this in view each pair of dies will generally permit no twist at all at the end A thereof and will permit the maximum amount of twist at the end B thereof, the degree of twist changing gradually and evenly and without sharp bends within the die. If desired and for the purpose of safety, that part of the die between the end A and the line V—V, that is, for a short distance from the end A, may have the same form that is shown on Fig. 5 or on Fig. 12, thus keeping the article untwisted for a short distance within the pair of dies. This, however, is not always essential. Furthermore, the full twist to be given to the article may be permitted for a short distance within the die at the end B, that is, the die may be lengthened at the end B, there having the full twist without change of pitch for a short distance, thus permitting the full twist in the article within the lengthened end of the pair of dies. It is difficult, however, to predetermine at all times the exact pitch of the final twist to be given the article, so that this is generally not advisable. Furthermore, while I prefer that the twist to be given the article within the die shall gradually and evenly range from full twist to no twist at all, yet I can in certain instances permit a gradually variable twist without a sharp end within the die ranging from almost full twist to almost no twist. This, however, does not always make certain of the best results.

For joining electrical conductors each comprising about seven copper strands, the whole conductor being about one-half inch in diameter, I find that a twist permitted within the die of 90° where the die is two inches in length will give good results. As stated, I prefer no sharp edges but prefer to round them all slightly.

While I have referred to and illustrated certain details, it is to be understood that these may be changed without departing from the spirit of the invention the scope of which is defined in the appended claims.

Having described my invention, what I claim and desire to secure by Letters Patent is—

1. A die for twisting a pair of cables, said die being made in two halves to grip opposite sides of the cables, each half of the die having grooves formed therein to receive the cables, the grooves in each die being parallel at one end and one of the grooves in each die being gradually enlarged toward and beneath the other groove to allow the cables when twisted to gradually assume the pitch of a final twist.

2. A pair of dies for twisting a pair of cables, each die being grooved to receive and enclose the cables, and one side of the groove in each die being gradually deepened and directed toward the opposite side of the groove, the deepened portion of one die being at one side and in the other die at the opposite side when the dies are assembled, said deepened portions allowing the cables to gradually assume the pitch of a final twist at the point where they are grasped by the dies.

3. A pair of dies for twisting a pair of cables enclosed in a sleeve, each die having a groove formed therein to receive and enclose the sleeve and cables when placed on opposite sides thereof, and one side of the groove in each die being gradually deepened and directed toward the opposite side of the groove, the deepened portion of one die being at one side and in the other die at the opposite side when the dies are assembled to allow the cables to gradually assume the pitch of a final twist at the point where they are grasped by the dies.

4. A die for use in twisting a pair of adjacent cables wherein the cables are encased in a sleeve, said die being characterized by being made in two halves, and the adjacent faces of the dies each having a pair of grooves formed therein, one groove in each die being directed to intersect and partly lie under an adjacent groove in that when the dies are placed on opposite sides of the cables they will allow the cables when twisted to gradually assume the pitch of the final twist.

ERNEST M. WRIGHT.